United States Patent [19]

Valier

[11] Patent Number: 4,591,041
[45] Date of Patent: May 27, 1986

[54] CLUTCH FRICTION DISK COMPRISING BALANCING MEANS

[75] Inventor: Carlo Valier, Pino Torinese, Italy
[73] Assignee: Valeo, Paris, France
[21] Appl. No.: 559,380
[22] Filed: Dec. 8, 1983
[30] Foreign Application Priority Data
  Dec. 9, 1982 [FR] France .................................. 82 20633
[51] Int. Cl.⁴ ........................ F16D 11/00; F16D 13/60
[52] U.S. Cl. ................................ 192/107 R; 74/573 R
[58] Field of Search ................ 74/573 R; 192/107 R, 192/107 C

[56] References Cited

U.S. PATENT DOCUMENTS

| | | | |
|---|---|---|---|
| 1,752,819 | 4/1930 | Tietz | 74/573 |
| 2,547,427 | 4/1951 | Zeidler . | |
| 2,993,386 | 7/1961 | McLendon | 74/573 |
| 3,203,205 | 8/1965 | Geibel et al. . | |
| 3,397,761 | 8/1968 | Lindquist | 192/107 C |
| 3,921,777 | 11/1975 | Rist | 192/107 C |
| 4,377,225 | 3/1983 | Lech, Jr. et al. | 192/107 C |

FOREIGN PATENT DOCUMENTS

| | | |
|---|---|---|
| 3046302 | 9/1980 | Fed. Rep. of Germany . |
| 3230021 | 2/1984 | Fed. Rep. of Germany . |
| 3230022 | 2/1984 | Fed. Rep. of Germany . |
| 3230023 | 2/1984 | Fed. Rep. of Germany . |
| 3230024 | 2/1984 | Fed. Rep. of Germany . |
| 2210245 | 7/1974 | France . |
| 741792 | 12/1955 | United Kingdom . |

Primary Examiner—Edward G. Favors
Attorney, Agent, or Firm—Charles E. Brown; Charles A. Brown

[57] ABSTRACT

A clutch friction disk comprises two friction facings attached by fixing members in the form of rivets to respective sides of a support. Balancing means are associated with the rivets, which to this end comprise an axial bore adapted to accommodate a balancing weight.

29 Claims, 6 Drawing Figures

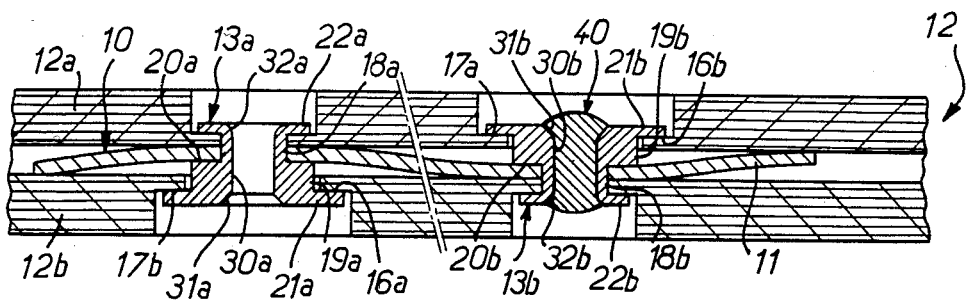
FIG. 2
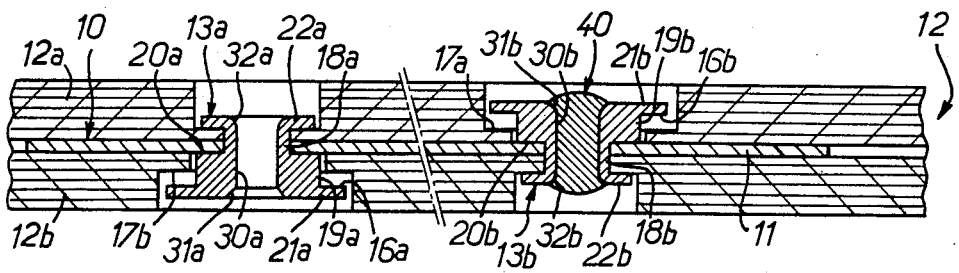
FIG. 3
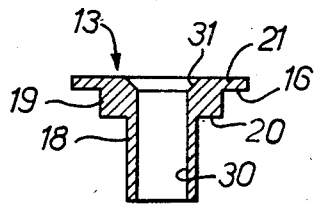
FIG. 4
FIG. 5
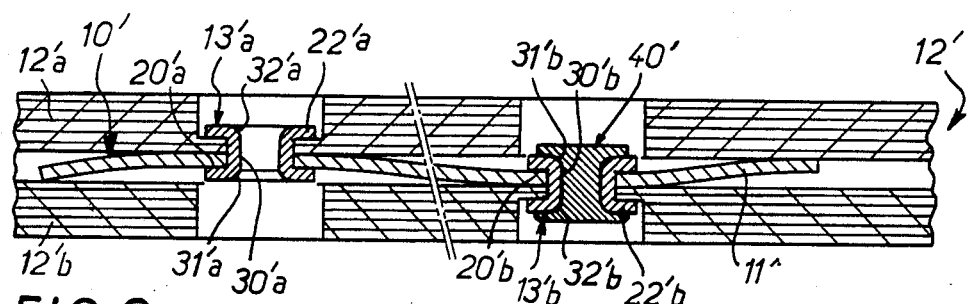
FIG. 6
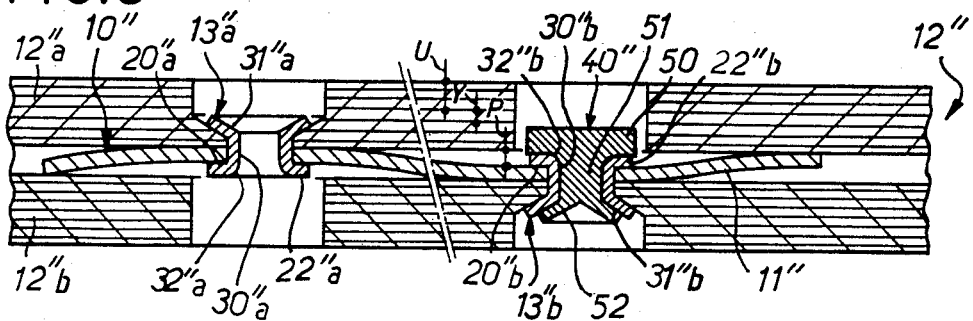

CLUTCH FRICTION DISK COMPRISING BALANCING MEANS

BACKGROUND OF THE INVENTION

1. Field of the Invention

The present invention relates to a clutch friction disk having a hub and at least two friction facings attached by fixing members to respective sides of a support coupled to said hub and comprising balancing means.

2. Description of the Prior Art

It is known that the rotation speeds of automotive vehicle motors are becoming increasingly higher. A disadvantage of this development is that the problem of balancing friction disks becomes all the more crucial, especially in the case of heavy goods vehicles.

Although the friction disk is the component part of a clutch with the lowest inertia, in view of the rotation speed involved any imbalance affecting it entails the risk of inducing cyclic vibration or disturbance.

It has, of course, already been proposed to balance the friction disks. Generally speaking, the balancing means employed consist in the addition of material in the vicinity of the hub of the friction disk. Specifically, in one known arrangement, the balancing means comprise a weight in the form of a rivet which is placed in a hole formed for this purpose, possibly one of a number of spaced holes, in a flange surrounding the hub.

Like other prior art balancing methods, this method has a number of disadvantages. Firstly, it may be noted that since balancing is effected in the vicinity of the hub its effectiveness is somewhat limited, all the more so in that balancing is effected in a region close to the axis of the friction disk. Also, at least one of the members of the friction disk, namely at least one of the flanges, is used for this balancing. One or more holes must be provided for attaching the balancing weight. Thus the use of this method significantly complicates the manufacture of a friction disk of this kind.

An object of the present invention is to reduce these disadvantages and to provide a simple, economical and effective means of improved balancing.

SUMMARY OF THE INVENTION

The invention consists in a clutch friction disk comprising a hub, at least two friction facings, a support for said friction facings coupled to said hub, fixing members adapted to attach said friction facings to respective sides of said support, and balancing means associated with said fixing members.

Apart from the fact that this arrangement leaves all component parts of the friction disk intact, it has the appreciable advantage of effecting balancing at the level of the friction facings, and thus at a much greater radial distance from the axis of the friction disk than is the case in the prior art.

According to another feature of the present invention, the fixing members comprise housing means adapted to receive a balancing weight.

As the friction facing fixing means are, in a manner known per se, distributed over the peripheral part of the friction disk, at various radii, balancing carried out in accordance with the present invention is highly effective since it is always possible to place a weight at a location near the mathematically ideal position.

According to a further feature of the present invention, the fixing members are hollow rivets and each balancing weight is fabricated from lead wire.

By virtue of these particularly advantageous arrangements, the balancing method is of great simplicity since all that is required, after threading the lead wire into the hollow rivet, is to crush the wire using a pair of pliers.

The improved effectiveness and the ease of use of the balancing means in accordance with the present invention, as compared with those of the prior art, not to mention the reduced cost, will be appreciated.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a partial view of this disk to a larger scale, in cross-section on the line II—II in FIG. 1.

FIG. 3 is a view analogous to FIG. 2 but showing the disk clamped up and having minimum thickness in the region of the facings.

FIG. 4 shows one of the rivets of FIGS. 2 and 3 in cross-section, before riveting.

FIG. 5 is a partial view corresponding to FIG. 2 and showing another embodiment in cross-section.

FIG. 6 is a partial view corresponding to FIG. 2 and showing a further embodiment in cross-section.

DESCRIPTION OF THE PREFERRED EMBODIMENTS

Figure 1:
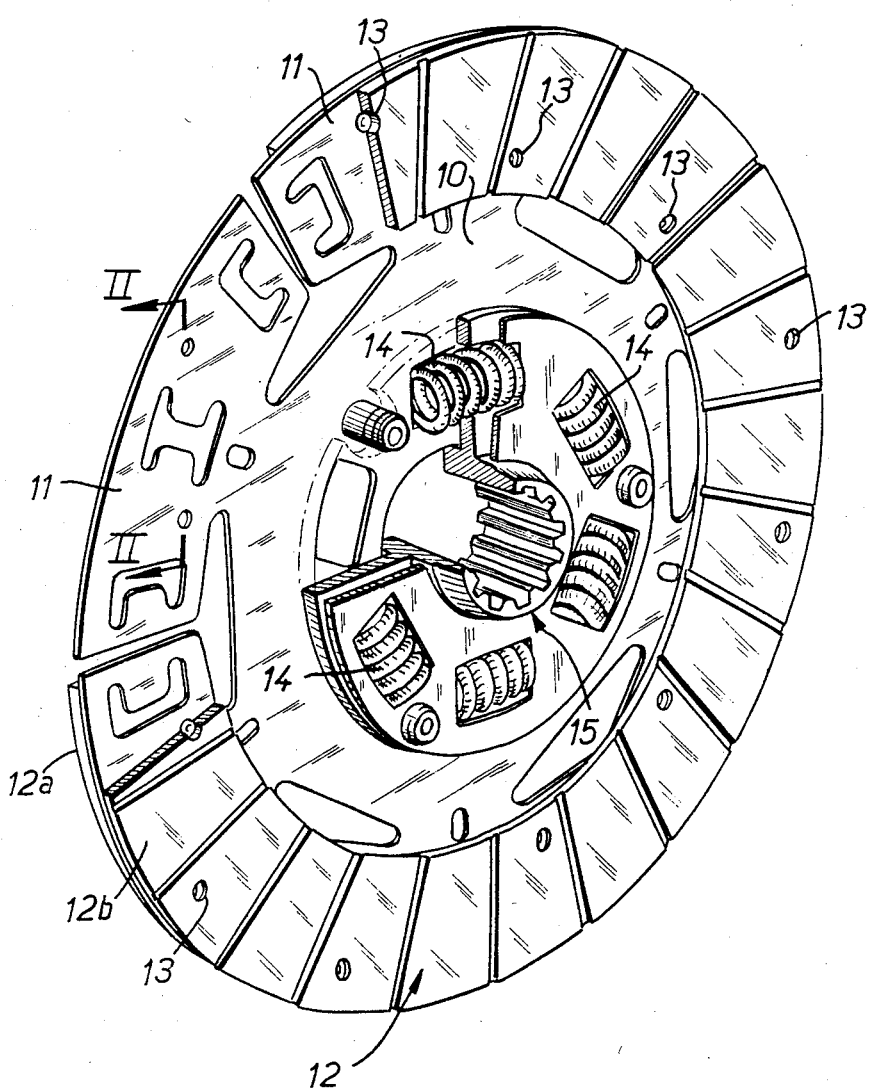
FIG. 1 is a general and partially cutaway view in perspective of a friction disk in accordance with the invention.

In the embodiment shown in FIGS. 1 to 3, a friction disk in accordance with the invention is intended, for example, to be fitted to the clutch of an automotive vehicle, being either clamped up between two plates of the clutch (not shown), or unclamped. The disk comprises (FIG. 1) a metal support or flange 10 of generally circular shape which is plane and perpendicular to the axis of the disk. In this embodiment, the support 10 has at its perimeter resilient portions 11 (FIGS. 1 and 2) which may be flattened out to provide an elastic resisting force when the disk is clamped up between the clutch plates. The disk also comprises facings 12 of a friction material disposed on each side of the support 10 and attached by fixing means, namely rivets 13, to the resilient parts 11 so that the thickness of the disk in the region of the facings 12 is elastically variable with a lower limit corresponding to total flattening (FIG. 3) of the resilient parts 11.

The support 10 (FIG. 1) is coupled by torsional damper springs 14 to a splined hub 15 which is adapted to be engaged upon a shaft (not shown) so that the latter is driven by the clutch plates when the disk is clamped up between the plates and uncoupled from said plates when the latter are not clamping up the disk.

In the example represented in FIGS. 1 to 3, the resilient parts 11 consist of undulating sectors whereas the facings 12 comprise two facings 12a, 12b of generally annular shape which are plane and perpendicular to the axis of the disk.

One of the facings 12, designated 12a, is attached (FIG. 2) by certain of the rivets 13, designated 13a, to the sectors 11 at the top of the undulations of these sectors which are situated on the same side as this facing 12a, whereas the other facing, designated 12b, is attached by the other rivets 13, designated 13b, to the sectors 11 at the top of the undulations of these sectors which are on the same side as facing 12b.

The rivets 13a which are attached to the facing 12a are adapted to permit the facing 12b to move closer to the facing 12a, and, likewise, the rivets 13b which are attached to the facing 12b are adapted to permit the facing 12a to move closer to the facing 12b, up to the point at which the undulations of the sectors 11 are completely flattened out (FIG. 3). Note that the rivets are at different radii from the center.

The facings 12a and 12b are interconnected by abutment means or separation limiters which are operative in a direction parallel to the axis of the disk and positively define an upper limit for the separation of the facings, that is to say an upper limit for the thickness of the disk in the region of the facings (FIG. 2). The abutment means are adapted to come into operation before the resilient parts 11 return by virtue of their inherent elasticity to the completely unstressed position.

In the example represented in FIGS. 1 to 4, these abutment means consist in an additional shoulder 16a on the rivets 13a which cooperates in abutting relationship with a bearing surface 17b on the facing 12b and an additional shoulder 16b on the rivets 13b which cooperates in abutting relationship with a bearing surface 17a on the facing 12a.

In accordance with the invention, the means for balancing the friction disk are associated with the means for attaching the friction facings.

To this end, said fixing means 13 comprise housing means 30 for a balancing weight 40.

In FIGS. 1 to 4, the housing means consist of an axial bore 30 in the rivet 13 and the balancing weight is fabricated from lead wire which is threaded into the bore 30 and is subsequently flattened using pliers.

In FIGS. 2 and 3, only rivet 13b is shown with a balancing weight 40.

The rivet 13, shown in FIG. 4 before riveting, comprises a tail 18 surmounted by a boss 19 which forms a bearing shoulder 20 adapted to permit attachment to the curved part 11 of the support. This boss 19 is in turn surmounted by a head 21 which forms the additional shoulder 16 adapted to permit an abutting relationship with the bearing surface 17 of the facings.

At its end 31 on the same side as the head 21, the bore 30 in the rivet 13 is widened out to constitute a member for retaining the weight 40 (see FIGS. 2 and 3).

Riveting is effected by supporting the head 21 against a backing pad while a tool cooperates with the hollow tail 18 to form a fixing bead 22 designated 22a in the case of rivets 13a and 22b in the case of rivets 13b in FIGS. 2 and 3.

This riveting operation also confers on the end 32 of the bore 30 on the same side as the bead 22 an opened out shape providing a second member for retaining the weight 40.

The bead 22a and the shoulder 20a clamp together the facing 12a and the resilient part 11 of the support 10. Likewise, the bead 22b and the shoulder 20b clamp together the facing 12b and the curved part 11 of the support 10.

Furthermore, by virtue of the abutting relationships at 16a, 17b on the one hand and at 16b, 17a on the other hand brought about by the additional head 21 of the rivets 13, the maximum thickness of the disk in the region of the facings is precisely defined and remains substantially constant irrespective of external conditions, in particular temperature.

The balancing operation, which is carried out once assembly of the disk has been completed, is particularly simple.

The friction disk is placed in a balancing machine to determine a region within the annular space defined by the friction facings 12 in which balancing may be effected by addition of further material.

As can be seen in FIG. 1, the rivets 13 are distributed over the whole of said annular space and, allowing for the permitted tolerance, there is inevitably at least one rivet 13 in the vicinity of the balancing region thus determined.

As has already been stated, in this embodiment the balancing weights are fabricated from lead wire the diameter of which is the same as that of the bores 30 in the rivets 13. Once the rivet destined to carry the weight has been determined, it is sufficient to cut off the necessary length of lead wire, which is at least equal to the length of the bore 30, to introduce this weight into the bore 30 in the rivet concerned, and to crush it against the retaining members, that is to say the opened out ends 31 and 32 of the bore 30, using a pair of pliers. In this way the weight is immobilized in the bore 30, particularly in the axial direction, and there is no risk of it being ejected when the disk rotates.

Note tht this operation is particularly simple to carry out and may be applied to friction disks of existing types which feature friction facing fixing rivets of the type described hereinabove.

In some friction disks the density with which the friction facing fixing rivets are distributed over the latter may be insufficient, given the tolerances which apply, for correct balancing to be achieved with a single weight, in which case there is nothing to prevent two or three weights in different rivets being used to achieve balancing.

In this case, the balancing machine must be adapted to:

determine the rivets to carry weights, determine the exact weight of lead wire to use in each case.

In the embodiment of FIGS. 1 to 4, the rivets 13 also act as abutment means which come into effect before the resilient parts 11 are returned by virtue of their inherent elasticity to the completely unstressed position.

It will be understood that the present invention is not limited to fixing means which also provide abutment means.

Thus (FIG. 5), if the rivets 13' do not have any additional head 21, other means (not shown) are provided to control the axial travel of the curved parts 11'.

The rivet 13' has an axial bore 30' and opened out ends 31', 32'.

Once again, the weight 40' consists of lead wire crushed into the bore 30', in this instance the bore 30'b.

FIG. 6 shows a further embodiment. The weight 40" is fabricated from steel. It is therefore larger, for the same weight, than one fabricated from lead.

In this embodiment, the rivets 13" have axial bores 30" and one opened out end 31". The balancing weight 40" is in the form of a peg having a head 50 and a trunk 51. The head 50 bears in the axial direction on the bead 22"b of the rivet 13"b. After the trunk is inserted in the bore 30"b, a tool is used to crush the end 52 of the trunk 51 against the opened out end 31"b of the bore 30"b, so that the weight 40" is immobilized in the axial direction, on the one hand by its head 50 and on the other hand by the end 52 of the trunk 51.

In this embodiment, since the head 50 of the weight 40″ is particularly bulky, it is necessary to make sure that the axial displacement P of the support 10″ is less than the wear (schematically represented by the dimension U in FIG. 6), increased by a safety margin Y.

It will be understood that various changes in the details, materials and arrangements of parts, which have been herein described and illustrated in order to explain the nature of the invention, may be made by those skilled in the art within the principle and scope of the invention as expressed in the appended claims.

For example, the three embodiments described with reference to FIGS. 1 to 6 relate to a friction disk of the progressive engagement type, this progressive action being achieved by the undulations 11 of the disk flange 10. It will be clear that the teaching of the present invention is applicable to all types of progressive engagement friction disk, whatever means are utilized to bring about such progressive engagement, and also to friction disks which do not feature progressive engagement and in which the friction facing support is plane.

In the latter case, it will be understood that an axial bore may be formed in the fixing rivets, in accordance with the teaching of the present invention, which consists, generally speaking, in the association of the balancing weights with the means for attaching the friction facings to the support, whatever the form of these means (rivets, bolts, etc) and this support (plane, undulating, circumferentially disposed vanes, etc).

Note also that the present invention is not limited to the use of lead for fabricating the balancing weights.

Note also that, in the case of progressive engagement disks, in the embodiment shown in FIGS. 1 to 3 the means for fixing the facings to the support, namely the rivets 13, also act to limit the separation between said facings. This limitation is achieved through the cooperation of the shoulders 16 of the rivets 13 with the bearing surfaces 17 of the facings.

There is naturally no reason why this limitation of the separating movement should not be achieved by the cooperation of a shoulder on the rivet 13 with a member attached to the flange, for example through the direct cooperation of the shoulder 16 with the undulation 11, the facings then having parts 17 removed.

I claim:

1. A clutch friction disk comprising a hub, at least two friction facings, an annular support for carrying said friction facings and coupled to said hub, fixing members attaching said friction facings to respective sides of said support, and including an axial bore and balancing weights received in said axial bore of at least some of said fixing members.

2. A friction disk according to claim 1, wherein each of said fixing members comprise means for mounting a said balancing weight.

3. A friction disk according to claim 2, further comprising means for axially retaining said balancing weights in the axial bores in both axail directions.

4. A friction disk according to claim 3, wherein said balancing weights have complementary means abutting said means for axially retaining said balancing weights.

5. A friction disk according to claim 1, wherein each of said balancing weights comprises an upset stud.

6. A friction disk according to claim 5, wherein said stud is made of soft, malleable metal.

7. A friction disk according to claim 6, wherein the metal is lead.

8. A friction disk according to claim 5, further comprising means for axially retaining said balancing weights in their associated axial bores in both axial directions.

9. A friction disk according to claim 8, wherein said balancing weights have complementary means for abutting siad retaining means.

10. A friction disk according to claim 1, wherein said support comprises resiliently deformable portions to provide progressive engagement and wherein said fixing members also constitute means for limiting the distance separating said friction facings.

11. A friction disk according to claim 10, wherein said fixing members are rivets each having a head forming an additional shoulder adapted to cooperate in abutting relationship with a corresponding bearing surface of one of said friction facings.

12. A clutch friction disk according to claim 1, wherein said balancing weights comprise enlarged ends and a trunk therebetween.

13. A clutch friction disk comprising a hub, at least two friction facings, an annular support carrying said friction facings and coupled to said hub, fixing members attaching said friction facings to respective sides of said support, each of siad fixing members having an axial bore means adapted to mount a balancing weight.

14. A friction disk according to claim 13, wherein each of said axial bore means comprises means for axially retaining the associated balancing weight in both axial directions.

15. A friction disk according to claim 14, wherein said associated balancing weight has complementary means abutting said means for axially retaining the associated balancing weight.

16. A friction disk according to claim 13, wherein said support comprises resiliently deformable portions to provide progressive engagement and wherein said fixing members also constitute means for limiting the distance separating said friction facings.

17. A friction disk according to claim 16, wherein said fixing members comprise hollow rivets each having a head forming an additional shoulder adapted to cooperate in abutting relationship with a corresponding bearing surface of one of said friction facings.

18. A clutch friction disk comprising a hub, at least two friction facings, an annular support for carrying said friction facings and coupled to said hub, fixing members attaching said friction facings to respective sides of said support, and balancing means associated with at least some of said fixing members, balancing means comprising balancing weights, each of said fixing members comprising means for mounting a said balancing weight, and each of said balancing weights comprising an upset stud.

19. A friction disk according to claim 18, wherein said means for mounting a said balancing weight comprise means for axially retaining the associated balancing weight in both axial directions.

20. A friction disk according to claim 19, wherein said associated balancing weight has complementary means abutting said retaining means.

21. A friction disk according to claim 18, wherein said stud is made of soft, malleable metal.

22. A friction disk according to claim 21, wherein said metal is lead.

23. A friction disk according to claim 18, wherein said means for mounting a said balancing weight comprises means for axially retaining said balancing weight in both axial directions.

24. A friction disk according to claim 23, wherein said associated balancing weight has complementary means abutting said retaining means.

25. A friction disk according to claim 18, whereing said means for mounting a said balancing weight comprises an axially extending bore in an associated said fixing member.

26. A friction disk according to claim 19, wherein upset ends of said studs bear against portions of said fixing means extending radially outwardly from said bore to restrain siad balancing weight against movement in opposed axial directions.

27. A friction disk according to claim 18, wherein each of said balancing weights is defined by a length of wire.

28. A friction disk according to claim 1, wherein upset ends of said studs bear against portions of said fixing means extending radially outwardly from said bore to restrain said balancing weight against movement in opposed axial directions.

29. A friction disk according to claim 1, wherein each of said balancing weights is defined by a length of wire.

* * * * *